Patented Dec. 4, 1934

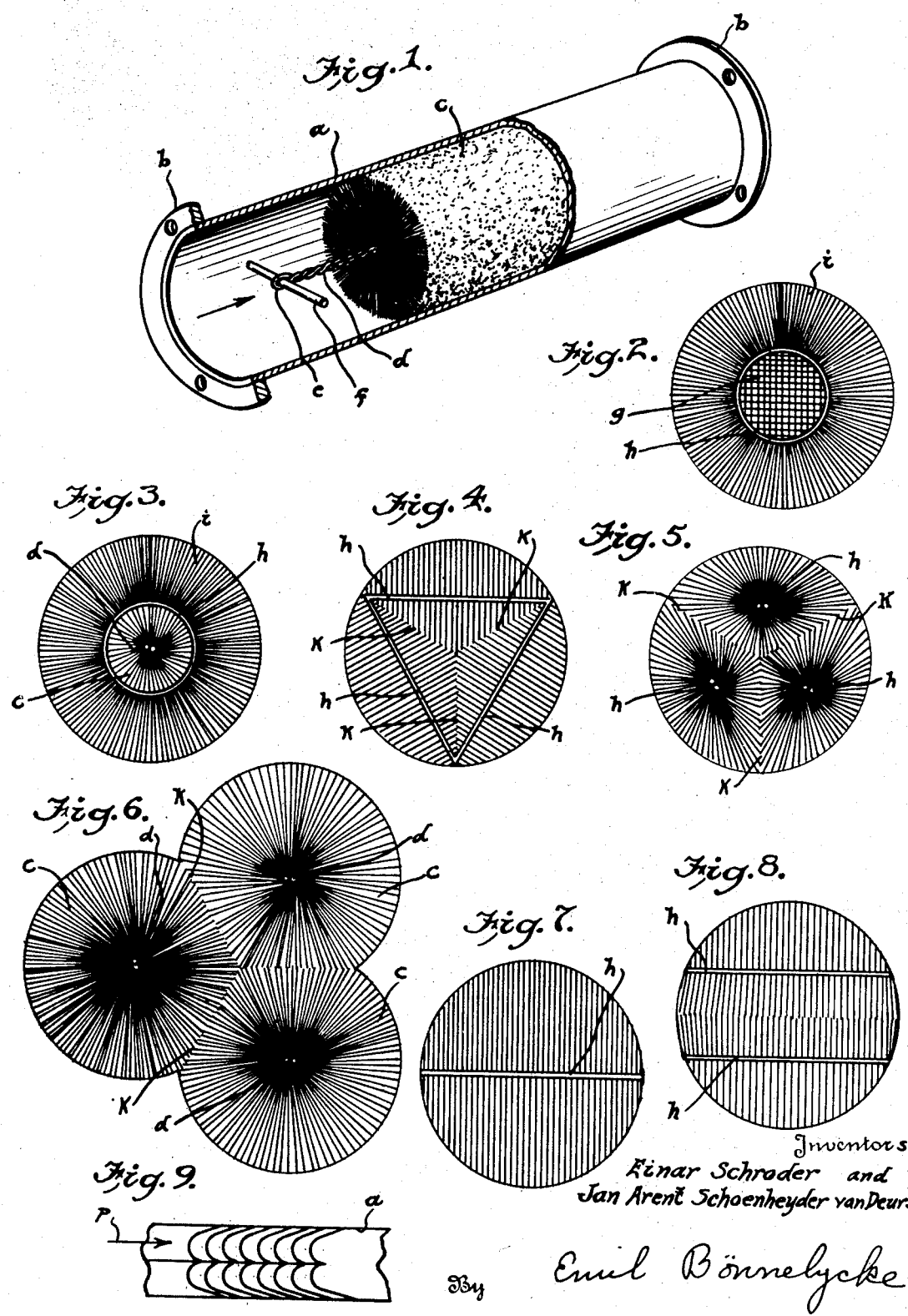

1,982,884

UNITED STATES PATENT OFFICE 1,982,884

APPARATUS FOR PRODUCTION OF FOAM BY MECHANICAL MEANS

Einar Schrøder and Jan Arent Schønheyder van Deurs, Copenhagen, Denmark

Application February 13, 1933, Serial No. 656,636 In Denmark February 16, 1932

3 Claims. (Cl. 261—75)

It has previously been proposed to generate foam mechanically by directing a foam-producing liquid and air or a gas through a vessel containing loosely deposited particles or closely adjacent stationary wires or wire gauzes disposed transversely to the direction of flow, the said wires or gauzes effecting an intimate mixing of the air and the liquid, before the latter flows away from the vessel. It has similarly been proposed to effect a uniform distribution of the air in the liquid by causing the air to penetrate into the liquid after passing through a porous body.

The heretofore known apparatuses of this nature suffer from the drawback that they will very easily be clogged during the use owing to impurities depositing themselves in the porous body or in the wire gauzes. This is especially the case when one has to use dusty air, or has to take from rivers, lake or the like the water forming the main constituent of the said liquid. Even if this water be directed through a filter it will not be possible, for practical reasons, to use a filter that is sufficiently effective to remove all such impurities from the water as might be able to clog the wire gauzes.

The present invention has for its object to produce an apparatus of the above mentioned kind by which no clogging can be produced by the solid impurities of relative small size that might be present in the liquid or the air, after these substances have passed a filter with a suitable but not too great degree of fineness.

For this purpose the apparatus is constructed, in a manner known per se, as an oblong vessel or a pipe, which at least for a portion of the passage way of the liquid and air through the same is filled with closely adjacent wires disposed transversely to the passage way. According to the invention these wires or a portion thereof are at one end attached to one or more stationary axial or transverse supporting members, in such a manner that they will form either a single brush or more brushes disposed side by side or in series, or two or more brushes encircling one another. The said brushes fill the passage area in the vessel or the pipe, against the inner face of which the free ends of the brush wires rest. These wires are made from metal or some other suitable material with a certain elasticity, and similarly rest against the brush wires of an adjacent brush, if several such brushes are placed side by side—all as appearing from the following description of the constructions of the invention shown on the drawing.

Fig. 1 shows, in perspective view, an apparatus according to the invention, partly in longitudinal section, Figs. 2–8 show, diagrammatically, cross-sections of various constructions of the brushes formed by the wires, and Fig. 9 shows, diagrammatically, a longitudinal section of a part of an apparatus of the kind shown in Fig. 1.

$a$ is a pipe or an oblong cylindrical vessel fitted at each end with a flange or shoulder $b$, by means of which the said pipe or vessel can be connected tightly to adjoining pipe lines, in such a manner that a foam-producing liquid and air or a gas under pressure, in a manner known per se, can be introduced through one end of the vessel and be directed out through the other end thereof and into an adjoining pipe line, hose or the like (not shown). The vessel may also form a part of this pipe line itself, and it is irrelevant, to the invention as such, whether the vessel be horizontal, vertical or sloping. In the construction shown in Fig. 1 the vessel contains a cylindrical brush $c$ consisting of a rod $d$ centrally disposed in the tubular vessel $a$ and fitted with radially disposed wires of metal or some other suitable material attached to the said rod in known manner and possessing a certain elasticity against bending stresses. The rod $d$, which for instance as shown may be made from two metal wires twisted together, terminates in an eyelet $e$ through which a rod $f$ is passed, which in any suitable manner is attached to the side walls of the vessel, or rests against projections on the inner face of the vessel $a$, in such a manner that the cylindrical brush formed by the rod $d$ and the wires attached thereto will not be able to move in the direction of flow of the liquid and air indicated by the arrow, when the said liquid and air are passed through the brush.

The free ends of the brush wires rest against the inner face of the vessel $a$. If the liquid or the air passing longitudinally through the vessel contains solid impurities, the latter will bend the brush wires so much in the direction of flow that the solid bodies will be conveyed through the vessel $a$ along the inside of the wall of the latter, without the brush wires being able to prevent this passage. When the impurities have moved past, the brush wires will move back and prevent a direct passage, along the inner face of the vessel $a$, of the liquid and the air between the said inner face and the outer ends of the brushes, for which reason the air and the liquid will always be compelled to flow through the spaces between the wires. Hereby a very efficient mixing of the air and the liquid will be effected, in such a manner that there will be produced a homogeneous dispersion at the pressure existing in the vessel, which pressure as a rule is maintained considerably higher than the atmospheric pressure, for instance between two and ten atmospheres. When the dispersion leaves the vessel $a$, for instance through a not shown hose attached to the rear end of the vessel, the pressure in the dispersion will gradually decrease, and thereby the dispersion will gradually expand and be converted into foam, when it leaves the said hose or the like.

In the construction shown in Fig. 1 all the wires are disposed on one common supporting member, viz, the rod $d$, and will form a cylindrical brush shaped like a brush-like bottle cleaner. The wires, however, may also be assembled in other suitable manner, for instance as shown in Fig. 2, in which the central parts of the wires form wire gauzes $g$ inside of a frame $h$, which serves as a supporting member for radially disposed wires $i$.

The latter form together an annular brush, the wires of which, with their free ends fit closely to the inner face of the vessel $a$. In the construction shown in Fig. 3, the wires are combined so as to form two brushes, viz, an annular brush $h, i$ with an annular supporting member $h$ and, disposed inside of the latter, a cylindrical brush $c$ with a supporting member $d$ disposed centrally in the vessel $a$ and being of similar nature as the one shown in Fig. 1.

In the constructions shown in Figs. 4 and 5, the wires are combined so as to form three brushes with supporting members $h$. The wires of the three brushes rest with their free ends partly against the inner face of the vessel $a$ and partly against the free ends of the wires of an adjacent brush, viz, along the surface indicated by the dotted lines $k$. In the construction shown in Fig. 4, the supporting members $h$ are disposed transversely to the direction of flow through the vessel, while in the construction shown in Fig. 5 they are disposed longitudinally in the vessel $a$.

In the construction shown in Fig. 6, three cylindrical brushes $c$ are used, which are placed side by side and are of the kind shown in Fig. 1, and the shape of the vessel is adjusted so as to suit the brushes. Here too the wires of the various brushes are in contact with each other along the dotted lines.

In the construction shown in Fig. 7 the brush wires are attached at their centre to the diametrical supporting member $h$ and in the construction shown in Fig. 8 the wires are distributed among the supporting members $h$, to which the wires are attached. In all the cases shown the passage area of the vessel is filled entirely with the wires on the brushes.

It will be seen directly that the brushes formed by the wires and the supporting members for the same may have any other shape than just those shown on the drawing, when merely the shape of the vessel $a$ is carefully adjusted according to the shape of the brushes, in such a manner that the latter will fill out entirely the passage area of the vessel, for the entire length or a part of the length of the vessel.

The brushes may thus be curved as indicated, diagrammatically, in Fig. 9, or they may be so long that when the brush is inserted into the tubular vessel $a$, and the brush wires thereby come into contact with the inner face, the said brush wires will assume, relatively to the direction of flow P of the dispersion, the reclining position shown in Fig. 9.

The brush $c$, instead of being cylindrical, may be conical, for instance in such a manner that the cross-sectional area thereof is increasing towards the outlet end of the vessel $a$, and instead of being adjusted to fit the curved boundary surfaces of a vessel or a pipe the brush may be adjusted so as to fit a vessel with polygonal cross-section.

The brush may further be curved, for instance, if the vessel is a curved piece of pipe.

Having now particularly described and ascertained the nature of our said invention and in what manner the same is to be performed we declare that what we claim is:—

1. An apparatus for mechanically generating foam comprising a tube through which foam-generating substances are to be passed and a stationary brush located in the said tube so as to fill up the free cross-sectional area of the latter and comprising a centrally disposed supporting member and a plurality of bristles supported by the said member and engaging at their free ends the inner wall of the tube and being free to move relatively thereto.

2. An apparatus for mechanically generating foam comprising a tube through which foam-generating substances are to be passed and a stationary brush located in the said tube so as to fill up the free cross-sectional area of same and comprising a centrally disposed supporting member detachably secured to the tube and a plurality of bristles supported by the said member and engaging at their free ends the inner wall of the tube and being free to move relatively thereto.

3. An apparatus for mechanically generating foam comprising a tube through which foam-generating substances are to be passed and a number of separate stationary brushes arranged side by side so as to fill up the cross-sectional area of the tube.

EINAR SCHRØDER.
JAN ARENT SCHØNHEYDER van DEURS.